United States Patent [19]

Ungar et al.

[11] Patent Number: 5,093,185
[45] Date of Patent: Mar. 3, 1992

[54] ABRASION RESISTANT LAMINATE

[75] Inventors: Israel S. Ungar, Randallstown; Robin D. O'Dell; Joseph A. Lex, both of Pasadena, all of Md.

[73] Assignee: Nevamar Corporation, Odenton, Md.

[21] Appl. No.: 679,503

[22] Filed: Apr. 1, 1991

Related U.S. Application Data

[60] Division of Ser. No. 895,474, Aug. 11, 1986, Pat. No. 5,037,694, which is a continuation-in-part of Ser. No. 686,350, Dec. 26, 1984, Pat. No. 4,713,138.

[51] Int. Cl.$^5$ .............. B32B 27/20; B32B 27/42; B32B 33/00
[52] U.S. Cl. .................. 428/204; 428/326; 428/328; 428/331; 428/336; 428/530; 428/908.8
[58] Field of Search .............. 428/326, 328, 530, 204, 428/331, 336, 908.8

[56] References Cited

U.S. PATENT DOCUMENTS

| | | |
|---|---|---|
| 2,366,564 | 1/1934 | Shaw . |
| 3,373,071 | 3/1968 | Fuerst . |
| 3,525,664 | 8/1970 | Hale et al. . |
| 3,928,706 | 12/1975 | Gibbons . |
| 3,946,137 | 3/1976 | Power et al. . |
| 4,123,579 | 10/1978 | McCaskey, Jr. . |
| 4,255,480 | 3/1981 | Scher et al. . |
| 4,322,468 | 9/1984 | Rayhaon . |
| 4,713,138 | 12/1987 | Ungar et al. ............ 156/307.4 |
| 5,037,694 | 8/1991 | Ungar et al. ............ 156/326 |

FOREIGN PATENT DOCUMENTS

| | | |
|---|---|---|
| 857491 | 12/1960 | United Kingdom . |
| 986721 | 3/1965 | United Kingdom . |
| 1013662 | 12/1965 | United Kingdom . |
| 1221976 | 2/1971 | United Kingdom . |
| 1348272 | 3/1974 | United Kingdom . |

Primary Examiner—James C. Cannon
Attorney, Agent, or Firm—Browdy and Neimark

[57] ABSTRACT

A wear and gouge resistant decorative laminate is made by consolidating, under heat and pressure, a suitable backing over which lays a decor layer covered by an overlay sheet, the overlay sheet being provided on its upper surface with an ultra-thin abrasion resistant layer consistent with the disclosure of Scher et al. U.S. Pat. No. 4,255,480 and optionally O'Dell et al. U.S. Pat. No. 4,499,137.

6 Claims, No Drawings

ABRASION RESISTANT LAMINATE

This application is a division of application Ser. No. 895,474, filed Aug. 11, 1986 and now U.S. Pat. No. 5,037,694 which is a continuation-in-part of application Ser. No. 686,350, filed Dec. 26, 1984 and now U.S. Pat. No. 4,713,138.

FIELD OF INVENTION

The present invention relates to laminates and more particularly to decorative laminates having high abrasion resistance.

BACKGROUND

High pressure decorative laminates are conventionally produced by stacking and curing under heat and pressure a plurality of layers of paper impregnated with various synthetic thermosetting resins. In normal practice the assembly, from the bottom up, consists of a plurality, e.g. three to eight, core sheets made from phenolic resin impregnated kraft paper, above which lies a decor sheet impregnated with melamine resin; on top of the decor sheet is often provided an overlay sheet which, in the laminate, is almost transparent and provides protection for the pattern sheet.

The core sheets are conventionally made from kraft paper of about 90–155 pound ream weight. Prior to stacking, the kraft paper is impregnated with a water-alcohol solution of phenol formaldehyde resole, is dried and partially cured in a hot air oven, and is finally cut into sheets.

The decor sheet is a high quality, 50–125 pound ream weight, pigment filled, alpha cellulose paper that has been impregnated with a water-alcohol solution of melamine-formaldehyde resin, dried and partially cured, and finally cut into sheets. The decor sheet, prior to impregnation with the resin, may be printed with a decorative design, or with a photo-gravure reproduction of natural materials, such as wood, marble, leather, etc., or it may be solid colored.

The overlay sheet was almost invariably used when the decor sheet had a surface printing in order to protect the printing from abrasive wear. The overlay sheet, a high quality alpha cellulose paper of about 15–35 pounds ream weight, is also impregnated with melamine-formaldehyde resin, dried, partially cured and cut in a manner similar to that used for the decor sheet, except that a greater amount of resin per unit weight of paper is used.

The individual sheets are stacked in the manner indicated above and the stack of sheets is placed between polished steel plates and subjected to about 230°–340° F. (e.g. 300° F.) at 800–1600 p.s.i. (e.g. 1000 p.s.i.) for a time sufficient to consolidate the laminate and cure the resins (e.g., about twenty-five minutes). This causes the resin in the paper sheets to flow, cure and consolidate the sheets into a unitary laminated mass referred to in the art as a decorative high-pressure laminate. If six sheets of impregnated core paper are used, there results a finished laminate having a thickness of about 50 mils, it being understood that a different number of sheets can be used to provide thicker or thinner laminates.

In actual practice, two laminated stacks are pressed back to back, separated by a coated release sheet that allows the two laminates to be peeled apart after separation. Also, a large proportion of the stacks are laminated with an aluminum foil-kraft paper composite sheet inserted between the overlay and the metal plate, with the aluminum facing the overlay, in order to obtain a laminate having a lower gloss and a slightly textured surface which is desirable for some products.

At the completion of the laminating operation, the backs of the laminates are sanded to permit gluing to particle board, plywood or other substrates. The glued, laminate surfaced panel is then fabricated into furniture, kitchen counter tops, table tops, store fixtures and other end-use applications widely accepted for the combination of appearance, durability and economy.

A number of variations of the above-described general process are known, particularly those operations designed to obtain special effects in appearance and texture. Also other curing cycles are possible and, in fact, sometimes other resin systems are used as well.

Besides decorative high-pressure laminates referred to above, there are also a number of low-pressure products which have been developed in resent years, including low-pressure laminates using either polyester resins, or melamine-formaldehyde resin. One of the fastest growing materials competing with high-pressure laminates in recent years is a product referred to as low-pressure melamine board which is normally pressed in a short cycle at 175–225 p.s.i. at 325°–350° F. These low-pressure products have the advantage of being normally less expensive, but they cannot be given the title of "high pressure laminates" because a high pressure laminate product must meet a variety of rigid standards promulgated by the National Electric Manufacturers Associates, NEMA LD3-1980, which includes standards relating to abrasive wear, stain resistance, heat resistance, impact resistance, dimensional stability, etc. While various other decorative surfacing materials, such as some of the low-pressure laminates, have certain of the desirable characteristic, no products other than high-pressure laminates currently available have all of these properties.

One of these properties in particular which is very important is abrasion resistance. A high-pressure decorative laminate must have sufficient abrasion resistance to permit use in high exposure areas such as dinette surface tops, check-out counters, etc. The standard NEMA test for abrasion resistance is NEMA test LD-3.01. In this test, a laminate sample is clamped on a rotating disc, over which ride two weighted rubber wheels, faced with calibrated sand-paper strips. As the laminate surface is rotated under the wheels, the abrasive action of the sand paper cuts through the surface of the laminate and gradually through the overlay until the printed pattern is exposed and destroyed. The NEMA standard for Class I laminate requires that the laminate, after four hundred rotation cycles, has no more than 50% of its pattern destroyed. The 50% end point is estimated by averaging the number of cycles at which the pattern shows initial wear, and the number of cycles at which the pattern is completely destroyed.

If a high-pressure decorative laminate is prepared in a conventional manner, with a normal 35–40% resin content in the decor sheets, but without an overlay sheet, the abrasion resistance will be only about 50–75 cycles. If specially formulated melamine resins are used in the decor sheet with a resin content of 50–55%, abrasion resistance of up to about 150–200 cycles are on occasion obtainable without an overlay sheet, but in this latter case the laminates have a tendency to develop surface craze and, furthermore, they are quite difficult to prepare due to the difficulty of impregnating the decor sheet in a uniform manner; additionally, they do not meet the 400 cycle minimum required by the NEMA standard.

Very significant improvements to the conventional system described above are disclosed in Scher et al., U.S. Pat. Nos. 4,255,480 and 4,263,081. These patents and their progeny disclose the production of highly abrasion resistant laminates without overlay, the decor sheet being coated with a ultra-thin layer of small abrasion-resistant particles, e.g. alumina, immobilized in place on the decor sheet by a suitable binder material, most desirably micro-crystalline cellulose. The elimination of the overlay sheet produces very significant economic advantages. In addition, the resultant laminates have superior abrasion resistance, meeting not only the highest NEMA abrasion resistance standards, but also having both superior "initial wear" resistance and superior abrasion resistance to rubbing and sliding cans.

The emphasis in the disclosure of the Scher et al U.S. Pat. No. 4,255,480 is on the economic advantages achieved by eliminating overlay, and it is pointed out at column 3 of this patent that the elimination of overlay saves raw material and avoids product loss attributable to handling the overlay. The invention of the Scher et al U.S. Pat. No. 4,255,480 and its progeny has been very important, even revolutionary, to the laminate art. By providing a concentrated ultra-thin layer of abrasion-resistant particles, vastly improved wear properties have been achieved. This has occurred without diminution of other necessary and required laminate characteristics, including resistance to heat, resistance to stain by common household chemical and foods, resistance to impact and resistance to boiling water, all consistent with the NEMA LD3-1980 standards.

More recently, a further improvement has been provided according to the O'Dell et al U.S. Pat. No. 4,567,087 by which the abrasion resistant surface according to Scher et al U.S. Pat. No. 4,255,480 is also made scuff resistant by the inclusion of solid lubricant. O'Dell et al U.S. Pat. No. 4,499,137 also relates to scuff resistant laminates.

More recently, a new process has been developed for producing such abrasion-resistant decorative laminate in a more economical fashion. The new process, set forth in the Ungar et al U.S. application Ser. No. 686,350, involves substantially simultaneously applying the ultra-thin coating while impregnating the decor paper.

In spite of these remarkable and important improvements as outlined above and disclosed in Scher et al U.S. Pat. No. 4,255,480, O'Dell et al U.S. Pat. No. 4,567,087 and Ungar et al Ser. No. 686,350, now U.S. Pat. No. 4,713,138 there are still occasions when a different type of approach is desirable. For example, in the manufacture of laminates intended for use in flooring, the laminate surface is exposed to a tremendous amount of wear. Even though the improvements of Scher et al, O'Dell et al and Ungar et al provide vastly improved wear resistance, these environments, such as for flooring, need even greater wear resistance.

Other problem areas are certain high abuse applications, where it is necessary that the surface not only resist wearing and scuffing, but also gouging. As the ultra-thin abrasion resistant coating of Scher et al and O'Dell et al is ultra-thin, under some unusual circumstances it may lack resistance to cutting or gouging. Once the surface is broken, the decor layer, especially if surface printed, may be gouged away and contrasting base paper exposed. Printing ink layers are very thin and in addition, printing is often on a contrasting paper which easily shows any breaks in the ink layer.

Another problem can occur in the manufacturing process. In spite of the improvements of Ungar et al Ser. No. 686,350, there are certain designs which are quite expensive to produce because they are run in such small quantities, e.g. for custom design purposes. It would be economically advantageous if the highly abrasion resistant products of Scher et al and O'Dell et al could be made without the processing in separate runs of small quantities of specially designed decor sheets.

SUMMARY

It is, accordingly, an object of the present invention to provide a laminate product having not only superior abrasion resistance consistent with the product of Scher et al U.S. Pat. No. 4,255,480, and optionally superior scuff resistance consistent with the products of O'Dell et al U.S. Pat. Nos. 4,567,087 and 4,499,137, but which also has superior gouge resistance.

It is another object to provide for improved decorative laminates capable of withstanding extraordinary conditions of wear, such as in flooring environments.

It is a further object of the present invention to provide for less costly decorative laminates having unusual decor sheets by simplifying the handling operations during their manufacture.

These and other objects of the invention are achieved according to the process of Ungar et al U.S. application Ser. No. 686,350, the contents of which are incorporated herein by reference, applied to overlay paper instead of to decor paper, followed by assembling in a stack from the top down the overlay paper provided with an ultra-thin abrasion resistant layer according to Ungar et al Ser. No. 686,350, a decor sheet and a plurality of core sheets. The assembly is then subjected to lamination under heat and pressure using conventional laminating conditions, and there is thus produced a decorative laminate having increased wear resistance and gouge resistance.

DETAILED DESCRIPTION OF EMBODIMENTS

According to a preferred procedure, high pressure decorative laminate is made according to the process of Ungar et al Ser. No. 686,350, except that the ultra-thin abrasion resistant composition optionally containing wax particles is applied to conventional overlay paper. The paper is partially cured to the B-stage in a standard fashion. The so-obtained overlay paper is assembled with conventional decor paper thereneath, below which are provided a plurality of core sheets. After laminating at 800-1200 psi and 265°-305° F., a high pressure decorative laminate is obtained having superior abrasion, scuff and gouge resistance. As the ultra-thin abrasion and scuff resistant coating is thin, clarity of the pattern of the decor paper is not severely disturbed.

In making decorative laminates having unusual patterns, e.g. custom runs, the present invention simplifies the processing considerably. If it is necessary to provide the abrasion resistant ultra-thin coating directly onto the decor sheet, then the coating and impregnating machine must be stopped each time there is a change in the decor paper. When this happens frequently, costly shut-down time increases. However, according to the present invention this problem is obviated by providing the ultra-thin abrasion resistant coating onto overlay paper, and the same overlay paper is used regardless of the nature of the decor paper, and even where perhaps only a few sheets of each of many different special types of patterns or decors are used; consequently shutdown time is reduced.

The following examples, offered illustratively, will further illustrate the invention.

EXAMPLE I

A laminating resin/abrasion resistant coating composition according to Ungar et al Ser. No. 686,350 was prepared by adding with stirring 156 parts by weight of water to 533 parts of melamine-formaldehyde resin (62% concentration), followed by mixing therewith 0.39 parts of surfactant (Triton CF-21), 0.27 parts of polyethylene glycol anti-foaming agent (Emerest 2652), and 1.1 parts of polyethylene wax (Shamrock PE 394). Next were added 11.1 parts of 30 micron aluminum oxide (WCA 30) at low shear mixing. Lastly there were added 8 parts of microcrystalline cellulose (Avicel RC 591) while mixing at high shear for two minutes.

While any laminating resin can be used, a melamine resin was used in this example having a 2-3 F/M mole ration and a water tolerance of 2-3. The stirring or mixing was carried out using a propeller blade; alternatively, a Cowles Dissolver can be used as well as other types of mixers. The viscosity of the composition was then adjusted to permit coating to about 186 cps at 80° F. using a Brookfield #2 spindle. Increasing the quantity of Avicel increases the viscosity, and decreasing the amount of Avicel decreases the viscosity.

The composition was then coated on 30 pounds per ream alpha cellulose overlay paper in an amount sufficient to give a 65% pickup, thereby impregnating the overlay paper to provide 50.8 pounds of melamine solids and 4.4 pounds volatile per ream, as well as an ultra-thin abrasion resistant coating having 1.68 pounds of alumina, 1.22 pounds of microcrystaline cellulose and 0.16 pounds of wax per ream.

The so-produced dried and B-staged overlay was laminated over normal decorative print paper saturated with melamine in the usual way, itself overlaying a plurality of phenolic impregnated core layers also prepared in the normal way. The resultant laminate met all NEMA properties except that initial wear was 1600 cycles instead of 275-375 cycles.

EXAMPLE II

Two additional runs similar to Example I were carried out except in one case 5.5 parts by weight of aluminum oxide were added to the coating/impregnating composition, and in the second case 22 parts by weight of aluminum oxide were used. Samples from Example I and the two runs of Example II were comparatively tested for initial wear. The results are shown in Table A below.

TABLE A

| Aluminum Oxide #/Ream | Initial Wear Cycles |
| --- | --- |
| 0.85 | 1150 |
| 1.68 | 1550 |
| 3.27 | 2575 |

When these results are plotted, they show a generally direct linear relationship between the quantity of aluminum oxide and the initial wear in cycles; however, if these figures are plotted and extrapolated back to zero alumina, the plot shows an initial wear in cycles of about 550 cycles which is a little higher than 325-400 cycles actually experienced.

The other properties of the samples tested were well within NEMA standards.

EXAMPLE III

Example II was repeated five times using in each case 1.68 pounds per ream of aluminum oxide WCA 30 microns. In each case a different pattern paper was used as identified in Table B below. For each run according to the present invention, there was also conducted a control run using overlay without the ultra-thin abrasion resistant coating. After production of the samples, they were comparatively tested for initial wear, the results being as shown in Table B below:

TABLE B

| | Initial Wear Cycles | |
| Pattern | Invention | Control |
| --- | --- | --- |
| W-8-94 | 1694 | 469 |
| AN-2-2 | 1600 | 350 |
| AR-2-1 | 1525 | 400 |
| LH-7-1 | 1525 | 475 |
| W-8-252 | 1600 | 375 |

In all five comparisons, laminates according to the present invention provided at least three times the abrasion resistance compared to their controls, as measured by the NEMA initial wear test. Inclusion of the solid wax particles gave superior scuff resistance. The added thickness provided by the overlay produced laminates having superior gouge resistance.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A wear and gouge resistant decorative laminate comprising a backing layer and laminated thereto a thermoset laminating resin impregnated decor sheet, said decor sheet having laminated to the upper surface thereof an overlay sheet having on its upper surface an ultra-thin abrasion resistant coating, said ultra-thin abrasion resistant coating having a thickness of up to about 0.3 mils and comprising a mixture of (1) and abrasion resistant hard mineral of size and quantity sufficient to provide for abrasion resistance without interfering with visibility and (2) stabilizing binder material for said mineral, said thermoset resin being impregnated throughout said decor layer and said overlay sheet and said ultra-thin coating, said binder material not interfering with visibility, and with said ultra-thin abrasion resistant coating forming the uppermost layer of said laminate.

2. A decorative laminate in accordance with claim 1, wherein said ultra-thin layer further comprises a solid lubricant in an amount sufficient to provide good scuff resistance.

3. A decorative laminate in accordance with claim 1, wherein said thermoset resin is melamine-formaldehyde resin or polyester resin.

4. A decorative laminate in accordance with claim 1, wherein said ultra-thin coating has a calculated thickness of about 0.05–0.3 mils.

5. A decorative laminate in accordance with claim 1, wherein said binder material comprises predominantly microcrystalline cellulose.

6. A decorative laminate in accordance with claim 1, wherein said abrasion resistant mineral particles constitute alumina, silica or mixtures thereof.

* * * * *